(12) United States Patent
Doan

(10) Patent No.: US 9,553,783 B2
(45) Date of Patent: Jan. 24, 2017

(54) SPAM FLOOD DETECTION METHODOLOGIES

(71) Applicant: salesforce.com, inc., San Francisco, CA (US)

(72) Inventor: Dai Duong Doan, New Brunswick (CA)

(73) Assignee: salesforce.com, inc., San Francisco, CA (US)

( * ) Notice: Subject to any disclaimer, the term of this patent is extended or adjusted under 35 U.S.C. 154(b) by 569 days.

(21) Appl. No.: 14/021,941

(22) Filed: Sep. 9, 2013

(65) Prior Publication Data

US 2014/0082182 A1 Mar. 20, 2014

Related U.S. Application Data

(60) Provisional application No. 61/701,508, filed on Sep. 14, 2012.

(51) Int. Cl.
| | |
|---|---|
| *H04L 12/24* | (2006.01) |
| *H04L 12/26* | (2006.01) |
| *H04L 12/58* | (2006.01) |
| *G06Q 10/10* | (2012.01) |
| *H04L 29/06* | (2006.01) |

(52) U.S. Cl.
CPC .......... *H04L 43/08* (2013.01); *G06Q 10/107* (2013.01); *H04L 51/12* (2013.01); *H04L 63/123* (2013.01); *H04L 63/1483* (2013.01)

(58) Field of Classification Search
CPC ........ H04L 43/08; H04L 51/12; H04L 63/123; H04L 63/1483; G06Q 10/107
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |

(Continued)

*Primary Examiner* — Dustin Nguyen
*Assistant Examiner* — Juan C Turriate Gastulo
(74) *Attorney, Agent, or Firm* — Lorenz & Kopf LLP

(57) ABSTRACT

A computer-implemented method analyzes a website to determine whether the website represents a potential source of spam, and, in response to the analyzing, flags content of the website as spam content. The determination can be made by computing a total number of content items associated with the website, calculating a publication frequency of the content items, and determining whether the website in its entirety represents spam content based on the total number and the publication frequency. The determination could also be made by generating a signature of a webpage containing a content item, obtaining an occurrence count for the generated characterizing signature, and, when the obtained occurrence count is greater than a threshold count, identifying the content item as spam.

7 Claims, 5 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,412,455 B2 | 8/2008 | Dillon |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0069667 A1* | 3/2006 | Manasse ............ G06F 17/30864 |
| 2006/0184500 A1* | 8/2006 | Najork ............... G06F 17/30864 |
| 2008/0235084 A1* | 9/2008 | Quoc ................. G06Q 30/0242 |
| | | 705/14.41 |
| 2008/0249972 A1 | 10/2008 | Dillon |
| 2009/0048904 A1 | 2/2009 | Newton et al. |
| 2009/0063414 A1 | 3/2009 | White et al. |
| 2009/0287641 A1* | 11/2009 | Rahm ................. G06F 17/30864 |
| 2011/0282943 A1* | 11/2011 | Anderson ............... G06Q 10/06 |
| | | 709/204 |
| 2012/0036580 A1* | 2/2012 | Gorny ................. H04L 63/1433 |
| | | 726/25 |
| 2013/0018823 A1* | 1/2013 | Masood ................ G06F 21/552 |
| | | 706/12 |

\* cited by examiner though RSS (1) SPAM FLOOD DETECTION METHODOLOGIES

CROSS-REFERENCE TO RELATED APPLICATIONS

This application claims the benefit of U.S. provisional patent application No. 61/701,508, filed Sep. 14, 2012.

TECHNICAL FIELD

Embodiments of the subject matter described herein relate generally to a computer implemented methodology for detecting the occurrence of a spam flood that involves content posted on websites, blogs, forums, and social networking sites.

BACKGROUND

The Internet is a source of much useful information. However, the content of the internet is also polluted with spam data. Spam filtering is therefore crucial as it helps to reduce the level of noise contained in information obtained by web crawling. A "spam flood" refers to a phenomena where hundreds or thousands of spam web pages are introduced into the Internet over the span of a few hours (in turn, a spam flood can propagate into a web crawler system and cause unwanted responses).

Accordingly, it is desirable to have a computer implemented methodology for detecting the occurrence of a spam flood that involves spam web pages, blog posts, or the like. In addition, it is desirable to provide and maintain a system that is capable of dynamically responding to a spam flood in an efficient and effective manner. Furthermore, other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter presented here generally relates to webcrawling technology that analyzes websites, webpages, website content, blogs, and the like. A blog is a discussion or collection of information published on the Internet, consisting of a series of discrete entries, called posts, typically displayed in reverse chronological order so the most recent post appears first. Crawlers can obtain updated information from a blog through its Rich Site Summary (RSS) feed. An RSS feed normally includes information such as summarized text, the publication date of a post, and the name of the author. RSS data can be utilized to support the techniques and methodologies described in more detail below.

Instead of considering each individual post, certain "overall" or "global" features or characteristics of a blog or website may be analyzed to detect spam floods. Specifically, two methods are presented here: (1) a methodology that eliminates blogs with a high volume and high frequency of posts; and (2) a methodology that investigates the hypertext markup language (HTML) signatures of blog sites. Regarding the first approach, a blog will be considered to be spam if it generates a very high number of posts in a short period of time. Research has shown that most (if not all) blogs are spam if the number of posts is greater than 700 and if the average amount of time between two posts is less than a minute. Accordingly, the first approach determines these factors for a given blog and flags or filters the blog if the factors satisfy the criteria associated with a spam blog. Regarding the second approach, HTML signatures are useful to address the scenario where many spam webpages are generated with spam content embedded into a fixed HTML template. This trick allows spammers to create thousands of different blogs within a short period of time, with each blog having only a few posts. The first approach described above may not be effective in detecting these types of spam blogs, because the volume and frequency of posts in each individual spam blog are not high. However, the HTML signature (which is a characterization of the website or webpage formatting) of each blog can be used to detect this form of spam flood. In accordance with this second methodology, a subset of HTML tags is selected for use in generating the signature of the particular webpage. A hashed version of the selected tags is stored in a shared cache for a fast lookup. Posts are marked as spam if they have the same hashed signature as one whose volume is greater than a threshold within a predefined time interval.

Figure 1:
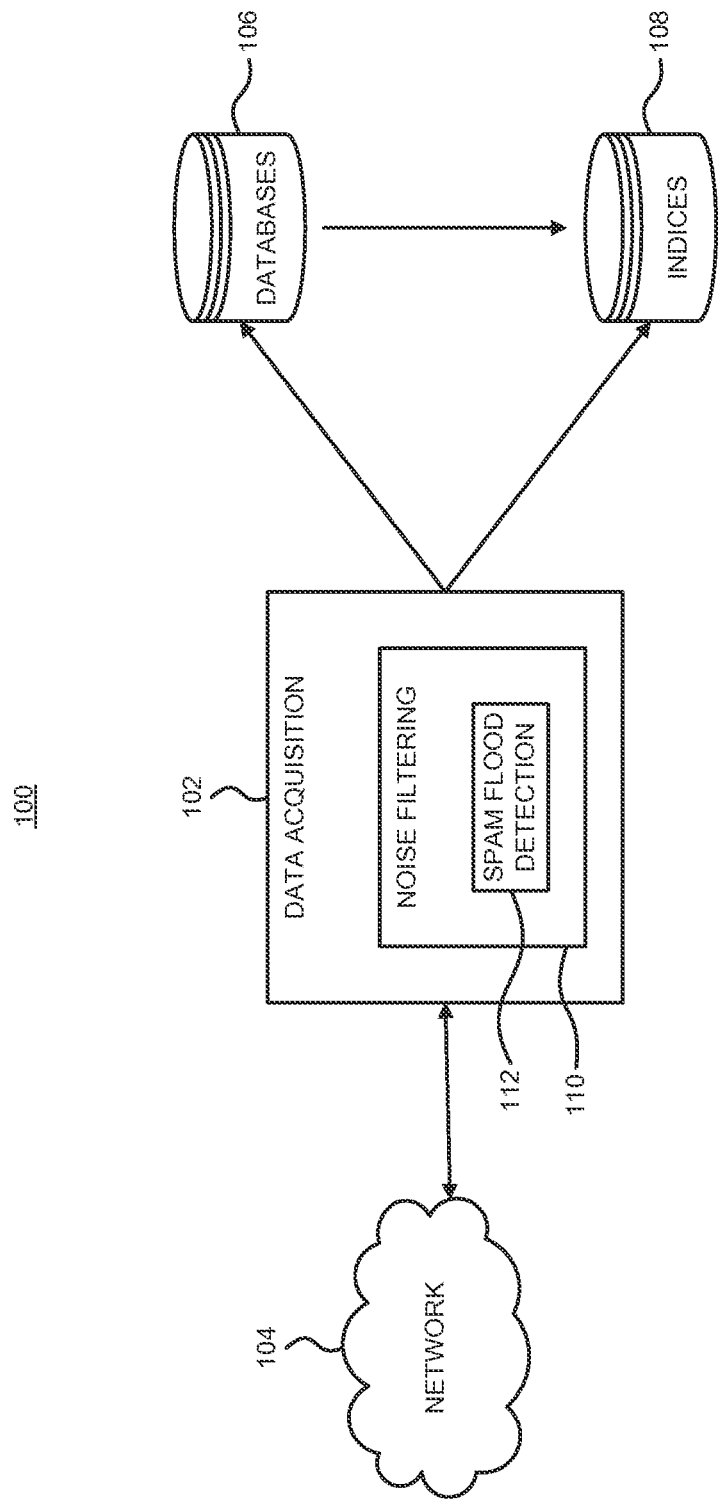
FIG. 1 is a simplified schematic representation of a portion of a webcrawler system that incorporates a spam flood detection feature.

Turning now to the drawings, FIG. 1 is a simplified schematic representation of a portion of a webcrawler system 100 that incorporates a spam flood detection feature. The system is computer-based and computer-implemented in that it may include any number of computing systems, devices, or components. FIG. 1 depicts a data acquisition module 102 of the system 100, which is suitably configured to obtain data and information from any number of online sources via a network 104. It should be appreciated that the network 104 may utilize any number of network protocols and technologies (e.g., a local area network, a wireless network, the Internet, a cellular telecommunication network, or the like). Although not always required, the network 104 provides Internet access to the data acquisition module 102 such that the system 100 can perform webcrawling to obtain content data, metadata, and other types of information regarding different websites, blogs, webpages, and other online sources as needed.

The system 100 includes or cooperates with one or more databases 106 and one or more indices 108 that are utilized to store and index information obtained and processed by the data acquisition module 102. Although not shown in FIG. 1, the databases 106 and indices 108 may communicate with other processing modules, software, application program interfaces, user interfaces, and the like for purposes of organizing, formatting, and presenting information to a user. Such elements, components, and functionality are commonly utilized with conventional webcrawling systems and applications and, therefore, they will not be described in detail here.

The data acquisition module 102 may be implemented as a suitably configured module of a computing system. In this regard, the data acquisition module 102 can be realized as a software-based processing module or logical function of a host computer system. The data acquisition module 102 performs a number of conventional data acquisition and processing functions that need not be described in detail here. In addition to such conventional functionality, the data acquisition module 102 also performs certain noise filtering techniques, which are schematically depicted as a noise filtering module 110 in FIG. 1. In accordance with some embodiments, the noise filtering module 110 is configured to detect and manage spam floods. This functionality is schematically depicted in FIG. 1 as a spam flood detection module 112. The spam flood detection module 112 determines a spam flood and, in response to the determination, flags, marks, or otherwise identifies the source (e.g., a blog, a website, user posts, or other online content items) as spam. The data related to the spam content can be saved and processed as usual, but the flagging of spam content allows the user to filter spam content if so desired while viewing, organizing, or analyzing webcrawler data.

Figure 2:
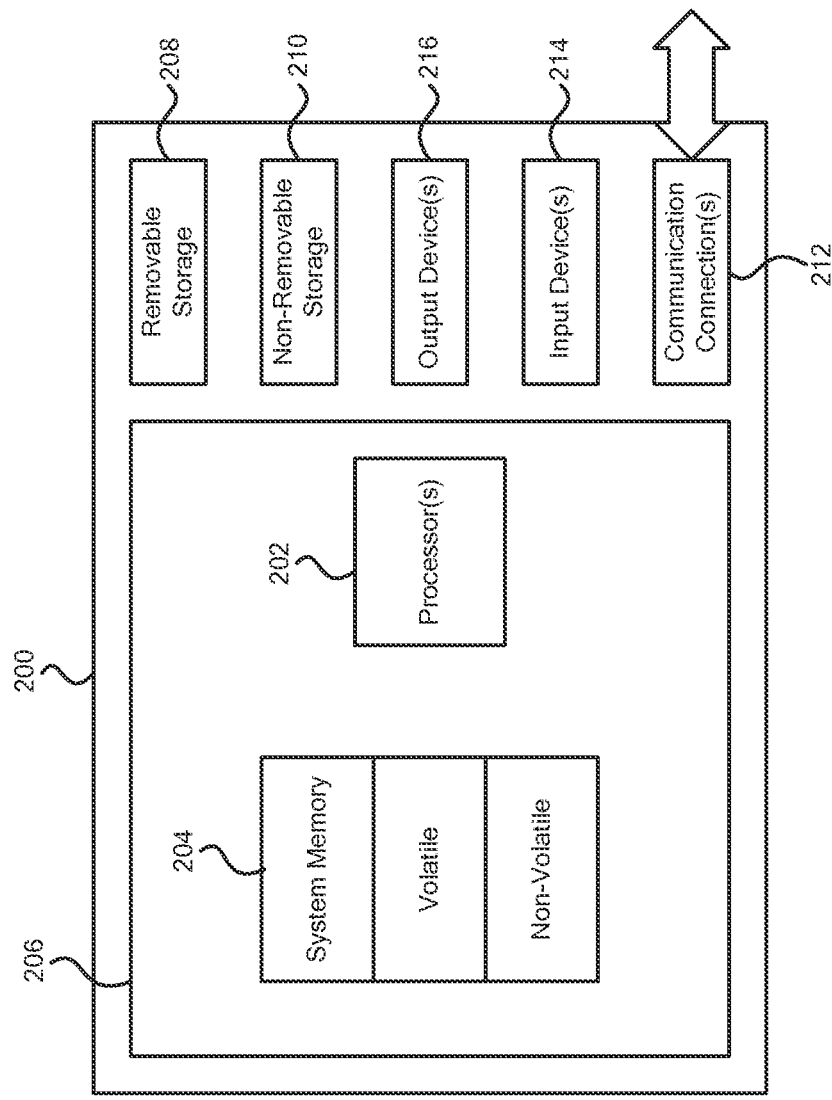
FIG. 2 is a simplified schematic representation of an exemplary computing system suitable for implementing spam flood detection.

FIG. 2 is a simplified schematic representation of an exemplary computing system 200 that is suitable for implementing the spam flood detection techniques described herein. In this regard, the spam flood detection module 112 may be implemented as software-based processing logic that is written and configured to support the various spam flood detection techniques and methodologies described in more detail below. In certain embodiments, therefore, the spam flood detection module 112 is realized using a computer readable medium having appropriately written computer-executable instructions stored thereon. When the computer-executable instructions are executed by a processor of the computing system 200, the spam flood detection methods described herein are performed. Thus, the computing system 200 described here could be used to implement the data acquisition module 102 shown in FIG. 1. Moreover, a client device or a user device could be configured in accordance with the general architecture shown in FIG. 2.

The computing system 200 is only one example of a suitable operating environment and is not intended to suggest any limitation as to the scope of use or functionality of the inventive subject matter presented here. Other well-known computing systems, environments, and/or configurations that may be suitable for use with the embodiments described here include, but are not limited to, personal computers, server computers, hand-held or laptop devices, multiprocessor systems, microprocessor-based systems, network PCs, minicomputers, mainframe computers, distributed computing environments that include any of the above systems or devices, and the like.

The computing system 200 and certain aspects of the exemplary spam flood detection module 112 may be described in the general context of computer-executable instructions, such as program modules, executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

The computing system 200 typically includes at least some form of computer readable media. Computer readable media can be any available media that can be accessed by the computing system 200 and/or by applications executed by the computing system 200. By way of example, and not limitation, computer readable media may comprise tangible and non-transitory computer storage media. Computer storage media includes volatile, nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing system 200. Combinations of any of the above should also be included within the scope of computer readable media.

Referring again to FIG. 2, in its most basic configuration, the computing system 200 typically includes at least one processor 202 and a suitable amount of memory 204. Depending on the exact configuration and type of platform used for the computing system 200, the memory 204 may be volatile (such as RAM), non-volatile (such as ROM, flash memory, etc.) or some combination of the two. This most basic configuration is identified in FIG. 2 by reference number 206. Additionally, the computing system 200 may also have additional features/functionality. For example, the computing system 200 may also include additional storage (removable and/or non-removable) including, but not limited to, magnetic or optical disks or tape. Such additional storage is represented in FIG. 2 by the removable storage 208 and the non-removable storage 210. The memory 204, removable storage 208, and non-removable storage 210 are all examples of computer storage media as defined above.

The computing system 200 may also contain communications connection(s) 212 that allow the computing system 200 to communicate with other devices. For example, the communications connection(s) could be used to establish data communication between the computing system 200 and devices or terminals operated by developers or end users, and to establish data communication between the computing system 200 and the Internet. The communications connection(s) 212 may also be associated with the handling of communication media as defined above.

The computing system 200 may also include or communicate with various input device(s) 214 such as a keyboard, mouse or other pointing device, pen, voice input device, touch input device, etc. Although the exemplary embodiment described herein utilizes a mouse device, certain embodiments can be equivalently configured to support a trackball device, a joystick device, a touchpad device, or any type of pointing device. The computing system 200 may also include or communicate with various output device(s) 216 such as a display, speakers, printer, or the like. All of these devices are well known and need not be discussed at length here.

Figure 3:
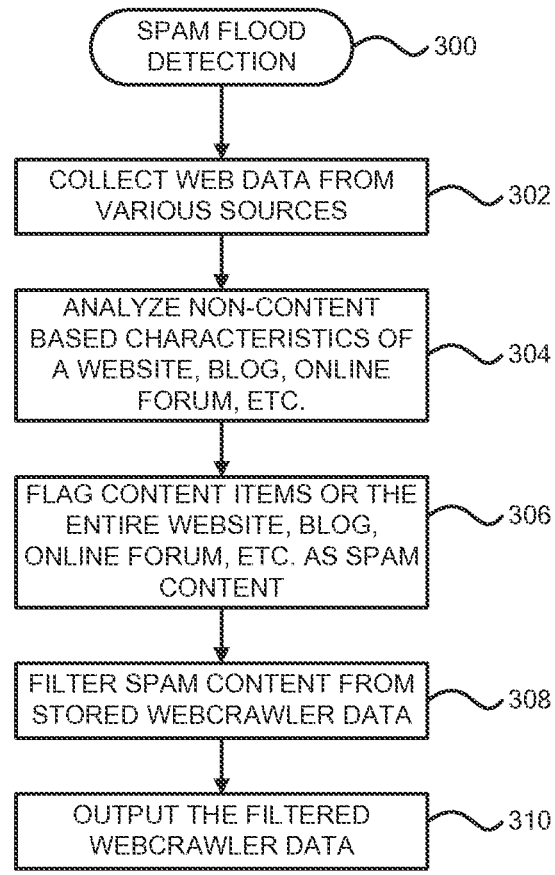
FIG. 3 is a flow chart that illustrates an exemplary embodiment of a spam flood detection process.

As mentioned above, an exemplary embodiment of the system 100 includes or cooperates with at least one processor and a suitable amount of memory that stores executable instructions that, when executed by the processor, support various data acquisition and spam flood detection functions. In this regard, FIG. 3 is a flow chart that illustrates an exemplary embodiment of a spam flood detection process 300, which may be performed by the system 100. The various tasks performed in connection with a process described herein may be performed by software, hardware, firmware, or any combination thereof. In practice, portions of a described process may be performed by different elements of the described system. It should be appreciated that an illustrated process may include any number of additional or alternative tasks, the tasks shown in a figure need not be performed in the illustrated order, and a described process may be incorporated into a more comprehensive procedure or process having additional functionality not described in detail herein. Moreover, one or more of the tasks shown in a figure could be omitted from an embodiment of the described process as long as the intended overall functionality remains intact.

The process 300 collects online web data from any number of various sources (task 302) using any appropriate technique or technology. In this regard, the process 300 may utilize conventional webcrawling methodologies to acquire the web data, which may include content, metadata, RSS data, HTML code, and/or other information associated with: blog sites; blog posts; websites; webpages; videos; news items; social media sites; user posts (e.g., posts on a social media site such as FACEBOOK); user comments; user messages (e.g., short messages such as those generated by the TWITTER service); and/or other forms of online content items. It should be appreciated that the foregoing list is merely exemplary, and that the list is not intended to be exhaustive, restrictive, or limiting in any way.

The process 300 may continue by analyzing certain characteristics of a website, blog, forum, webpage, or other online content of interest (task 304). For the sake of simplicity and brevity, the following description assumes that the online content under investigation is a blog site. The analysis performed during task 304 is intended to determine whether the blog site represents a potential source of spam (rather than a legitimate blog site that contains valid, original, or other content that might be of interest to an end user of the webcrawling system). In certain embodiments, task 304 analyzes non-content based characteristics of the online item under analysis. Moreover, task 304 need not review or analyze the actual content being conveyed by the online item. Rather, task 304 may focus on particular global or overall characteristics of the online item that do not necessarily depend on the actual content being conveyed. In this way, the spam flood detection process 300 is agnostic with respect to the actual content conveyed by the blog site. For example, the process 300 need not capture and analyze the actual written content of blog posts. Instead, the process 300 concentrates on other detectable characteristics or metrics associated with the blog site, such as the volume of blog posts, the publication frequency of blog posts, the HTML formatting of the blog site, the arrangement or layout of HTML tags utilized by the blog site, and the like (see the following description related to FIG. 4 and FIG. 5).

This example assumes that the process 300 determines that at least some of the content of the blog site is spam. Accordingly, in response to the analyzing, the process 300 flags or identifies at least some content of the blog site (or website, webpage, etc.) as spam content (task 306). In certain situations, task 306 flags the blog site or website in its entirety as spam content. If the blog site or website under analysis includes a plurality of webpages (which is often the case), then task 306 may flag one or more webpages of the site as spam content, while leaving other webpages of the same site unflagged. In other situations, task 306 flags at least one individual post, comment, user message, or other content item (of a given blog site, website, or webpage) as spam content. Task 306 flags, marks, or otherwise indicates spam content in any suitable manner that enables the host system to quickly and efficiently identify and distinguish spam content from non-spam content. For example, task 306 may create or update metadata that designates spam content. As another example, task 306 may update the indices utilized by the host system for purposes of identifying spam content. As yet another example, task 306 could update a status property of a data object that stores content items as a way to identify the items as spam.

Marking the spam content is desirable to enable the host system to quickly and easily filter spam content from the stored webcrawler data (task 308). Notably, task 308 could filter and disregard the flagged spam content (if, for example, a user is only interested in non-spam items), or it could filter and disregard the non-spam content (if, for example, a user is interested in viewing the spam content). Regardless of the specific form of filtering performed at task 308, the process 300 may continue by outputting the filtered webcrawler data for presentation to a user (task 310). The filtered data can be output in any desired human-readable format, e.g., a displayed or printed report, a saved computer-readable file, or the like. In practice, task 308 and task 310 could be performed at any time while the remaining tasks of the process 300 continue in an ongoing manner. In this way, the process 300 can monitor for occurrences of spam floods in a continuous manner while flagging spam and updating the databases and indices of the host system (see FIG. 1) to enable users to view, format, and analyze the stored and flagged data at their convenience.

Figure 4:
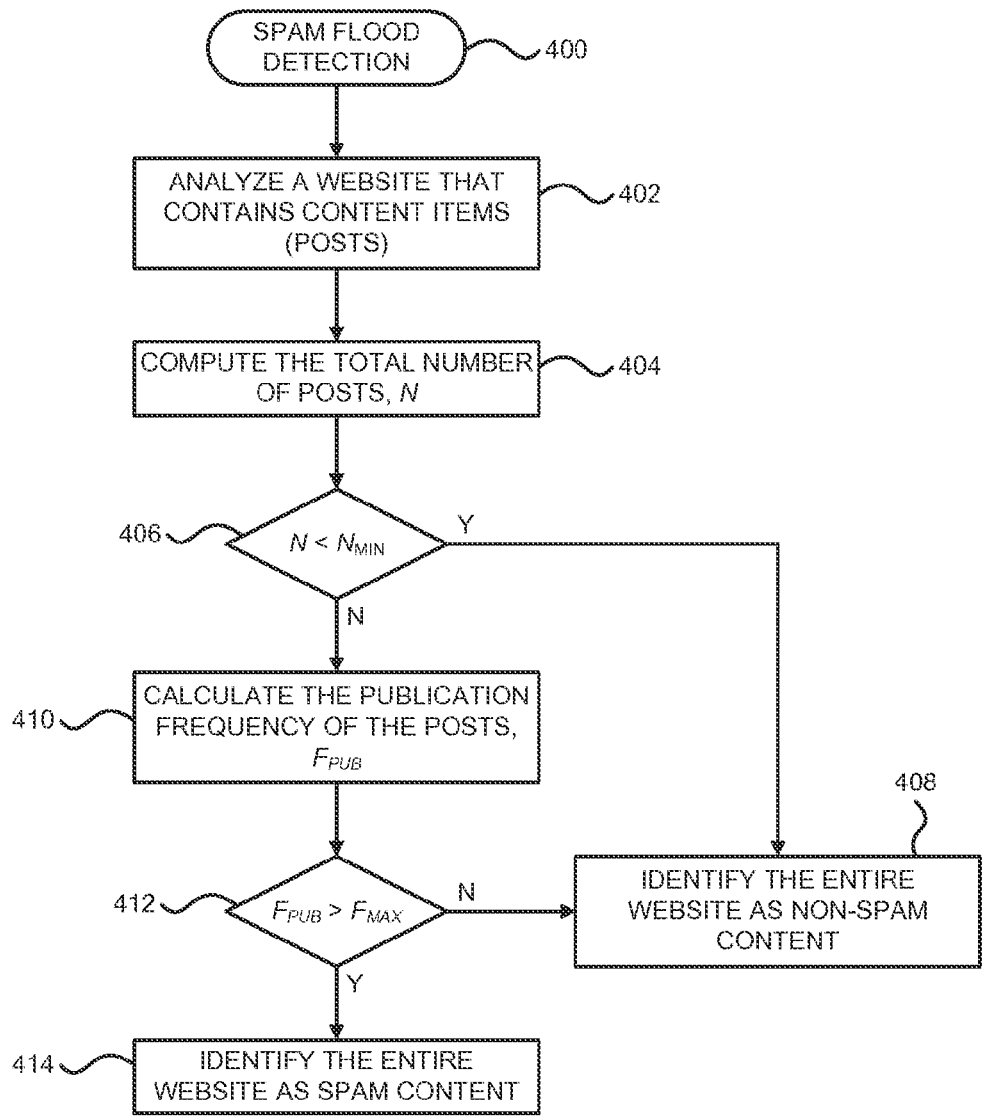
FIG. 4 is a flow chart that illustrates another exemplary embodiment of a spam flood detection process.

FIG. 4 is a flow chart that illustrates an embodiment of a spam flood detection process 400 that considers the post count and publication frequency of posts when checking for spam. The process 400 may be performed in conjunction with the generalized spam flood detection process 300 described above. Thus, the process 400 analyzes a blog site or a website that contains a plurality of content items (task 402). This example assumes that the content items are posts that appear on or in association with a blog site of interest. The process 400 computes or otherwise determines the total number of posts, N, associated with the blog site (task 404). In accordance with certain embodiments, the total number of posts can be computed by reviewing the information in the RSS feed of the blog site under analysis.

The illustrated embodiment uses the post count as one factor for determining whether or not the blog site in its entirety is spam content. To this end, the process 400 compares the computed value of N to a threshold number, $N_{MIN}$ (query task 406). If N is less than $N_{MIN}$ (the "Yes" branch of query task 406), then the process 400 identifies the blog site in its entirety as non-spam content (task 408). The process 400 utilizes the post count threshold because research has revealed that blog sites having a very high number of posts are likely to be "spam farms" that include automatically generated posts. The actual value of $N_{MIN}$ may vary from one embodiment to another, and the value may be user-configurable. In certain non-limiting implementations, $N_{MIN}$ has a value within the range of about 500 to 1000.

If N is greater than or equal to $N_{MIN}$ (the "No" branch of query task 406), then the process 400 assumes that the blog site might be a source of spam. Accordingly, the process 400 continues by calculating a publication frequency, $F_{PUB}$, for the total number of posts under consideration (task 410). The publication frequency can be calculated using any suitable formula or algorithm. This non-limiting example calculates the publication frequency in accordance with the expression $$F_{PUB} = \frac{N}{T_2 - T_1}.$$

In this expression: $F_{PUB}$ is the calculated publication frequency (expressed in posts per minute); $T_1$ is a publication time of an oldest content item (e.g., blog post) in the website; $T_2$ is a publication time of a newest content item (e.g., blog post) in the website; and N is the computed total number of content items.

The illustrated embodiment uses the publication frequency as another factor for determining whether or not the blog site in its entirety is spam content. Accordingly, in certain scenarios the process 400 determines whether a website in its entirety represents spam content, based on the computed total number of posts and the calculated publication frequency. To this end, the process 400 compares the calculated publication frequency to a threshold frequency, $F_{MAX}$ (query task 412). If $F_{PUB}$ is less than or equal to $F_{MAX}$ (the "No" branch of query task 412), then the process 400 identifies the blog site in its entirety as non-spam content (task 408). The process 400 utilizes the publication frequency in this way because research has revealed that blog sites having a very high post publication frequency are likely to be "spam farms" that include a large number of posts that are automatically published in a very short period of time. The actual value of $F_{MAX}$ may vary from one embodiment to another, and the value may be user-configurable. In certain non-limiting implementations, $F_{MAX}$ has a value that is less than about five posts per minute.

If $F_{PUB}$ is greater than $F_{MAX}$ (the "Yes" branch of query task 412), then the process 400 assumes that the blog site is a source of spam content. Accordingly, the process 400 continues by identifying the website (e.g., the blog site) in its entirety as spam content (task 414). Thus, a blog site will be flagged as a spam site if: (1) it exhibits a large number of blog posts; and (2) it exhibits a high post publication frequency. Otherwise, the blog site will be flagged as non-spam content.

It should be appreciated that alternative thresholding schemes and/or criteria could be used for the decisions made during query task 406 and query task 412. For example, different threshold values could be used to accommodate different operating conditions, days of the week, categories of genres of content under investigation, or the like. As another example, more complicated decision algorithms could be implemented rather than the simple single-value thresholds mentioned above. These and other options are contemplated by this description.

Figure 5:
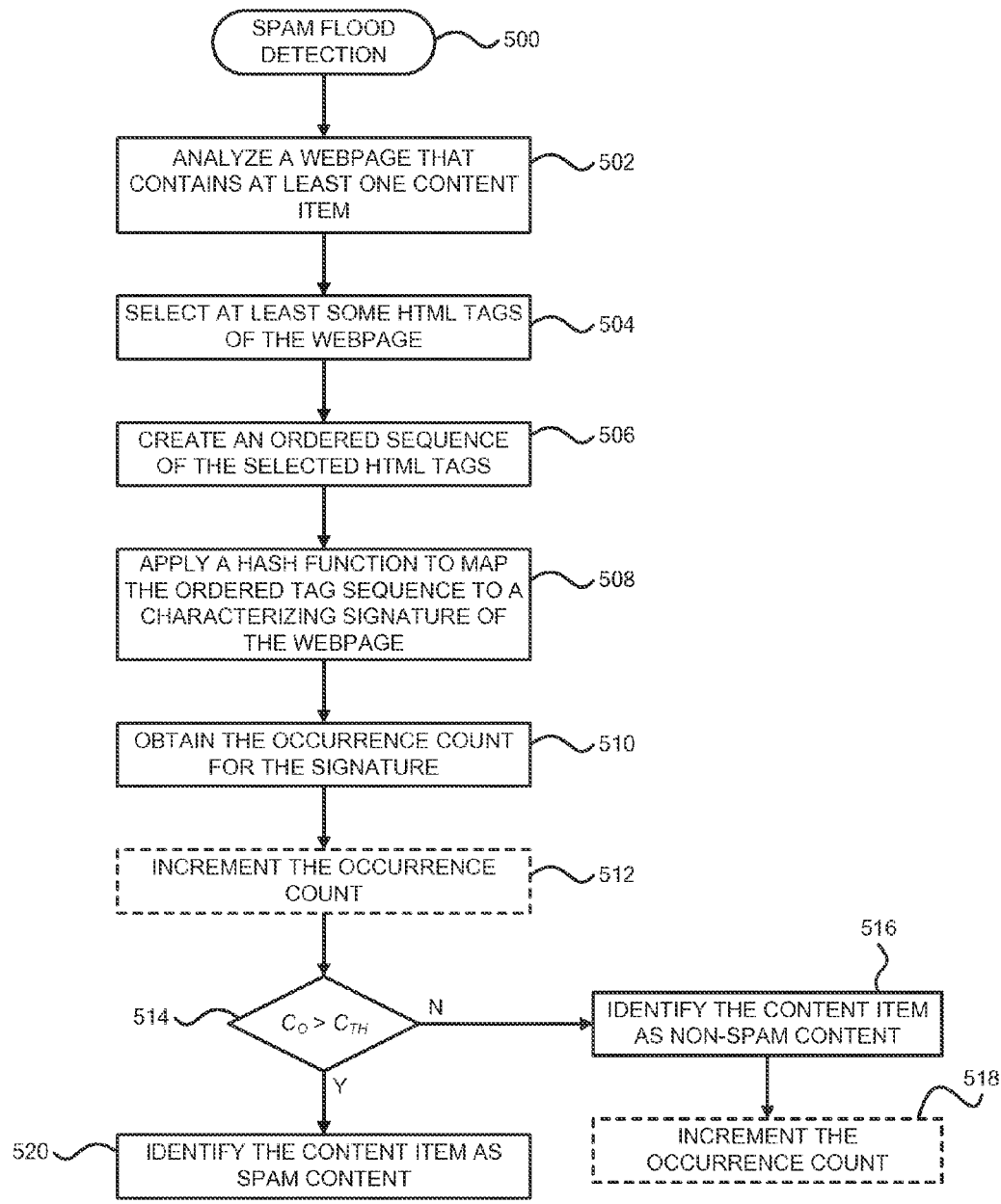
FIG. 5 is a flow chart that illustrates yet another exemplary embodiment of a spam flood detection process.

FIG. 5 is a flow chart that illustrates an embodiment of a spam flood detection process 500 that considers the HTML formatting or arrangement of a webpage when checking for spam. The process 500 may be performed in conjunction with the generalized spam flood detection process 300 described above, and it could also be executed concurrently with the process 400. Thus, the process 500 analyzes a webpage that contains at least one content item (task 502). The webpage under analysis may be, for example, a blog page or any page having one or more posts, messages, articles, comments, or the like. This example assumes that the content items are posts that appear on or in association with a blog site of interest.

The illustrated embodiment of the process 500 selects or identifies at least some of the HTML tags of the webpage under analysis (task 504). In this regard, the HTML tags represent one type of webpage formatting data that is associated with the webpage under investigation. In accordance with commonly used HTML syntax, most if not all HTML elements begin with a tag, which is written as a text label surrounded by angle brackets. The actual HTML content follows the starting tag, and is usually followed by an ending tag (which also has a slash after the opening angle bracket to distinguish it from starting tags). Thus, task 504 can be performed by analyzing the underlying HTML code, elements, and data to find and select the desired number of HTML tags. In certain embodiments, task 504 simply identifies and selects all of the HTML start tags. In more complex implementations, the selection performed at task 504 may be governed by selection criteria or a selection algorithm that chooses some, but not all, of the HTML tags of the webpage. For instance, task 504 may select every other HTML tag in the order of appearance.

As one simple example, assume that the webpage under analysis includes the following selected HTML start tags:

```
<html xxxxxxxxxxxxxx xxxxxx xxxxx xxx
<head> xxxxxxxxxxxxxx xxx x xxxx xxxxx
<title> xxxxxxxxxxxxxxx xxxxxx xxxx
<meta xxxxxxxxxxxxxxx xxxx xxx xxxxxxxxx
```

The "x" characters represent dummy text, which is unimportant for purposes of this description. The HTML start tags for this example are: "<html", "<head>", "<title>", and "<meta". In certain embodiments, the process 500 will select a plurality of HTML tags at task 504 and then continue by creating an ordered sequence of the selected HTML tags (task 506). In accordance with one straightforward approach, task 506 places the selected HTML tags into their order of appearance. For this particular example, therefore, the ordered sequence will be as follows: "<html<head><title><meta". Of course, the specific syntax may be different, depending on the particular embodiment. For instance, the process 500 may strip the angle brackets away before creating the ordered sequence, or it may remove all spaces, or it may add characters or spaces if so desired.

Next, the process 500 generates a characterizing signature of the webpage, using the selected HTML tags. More specifically, the process 500 applies a hash function, a translation algorithm, an encoding algorithm, or any suitable transformation formula to the ordered sequence of HTML tags to map the selected HTML tags to the characterizing signature (task 508). Although any appropriate algorithm or formula may be utilized at task 508, in certain non-limiting embodiments, task 508 applies the well-known SHA-1 hash function to the ordered sequence of HTML tags (which results in a 160-bit hash value). Notably, given the same string of HTML tags, task 508 will generate the same characterizing signature (hash value). As explained below, this allows the host system to keep track of how often the same ordered sequence of HTML tags appears in webpages under analysis.

If the signature is new to the host system (i.e., it has not been previously generated), then the process 500 may exit after task 508. At this point, however, the new signature is saved (in, for example, cache memory for easy access) and the corresponding occurrence count for the new signature is initiated. In this way, the host system maintains an occurrence count for each unique signature. This example assumes that the generated signature already has an occurrence count associated therewith. Accordingly, the process 500 obtains or accesses the occurrence count for the generated characterizing signature (task 510). At this point, the process 500 may increment the occurrence count if so desired (optional task 512). Task 512 is considered optional here because the process 500 may increment or adjust the occurrence count at any desired time. For example, the count could be incremented immediately upon generating the signature, or after each iteration of the process 500.

The illustrated embodiment uses the occurrence count as one factor for determining whether or not to indicate spam content. To this end, the process 500 compares the obtained occurrence count, $C_O$, to a threshold count, $C_{TH}$ (query task 514). If $C_O$ is less than or equal to $C_{TH}$ (the "No" branch of query task 514), then the process 500 identifies the content item as non-spam content (task 516). Thereafter, the process 500 may increment the occurrence count if so desired (optional task 518, which is performed in lieu of optional task 512). Tasks 512, 518 are optional in FIG. 5 because the process 500 could be designed to increment the occurrence count at any convenient time.

If the obtained occurrence count is greater than the threshold count (the "Yes" branch of query task 514, then the process 500 assumes that the content item is spam content. Accordingly, the process 500 continues by identifying the content item (e.g., a post, an online article, a webpage, or the like) as spam content (task 520). Thus, online content will be flagged as spam site if: (1) the characterizing signature of the associated webpage matches a saved signature; and (2) the host system has counted a high enough number of occurrences of the same signature. Otherwise, the content item will be flagged or passed as non-spam content. Thus, until the threshold occurrence count has been reached for a given characterizing signature, the process 500 might pass along some content that would otherwise be marked as spam.

The process 500 utilizes the occurrence count threshold because research has revealed that spam websites are often generated from a common, fixed, and repeated HTML template. Consequently, the same HTML template will utilize an identical and repeatable HTML tag format and arrangement. The process 500 takes advantage of this observation by generating the characterizing signature from the HTML tags. The actual value of $C_{TH}$ may vary from one embodiment to another, and the value may be user-configurable. In certain non-limiting implementations, $C_{TH}$ has a value within the range of about 80 to 120 (per minute).

It should be appreciated that alternative thresholding schemes and/or criteria could be used for the decisions made during query task 514. For example, different threshold count values could be used to accommodate different operating conditions, days of the week, categories of genres of content under investigation, or the like. As another example, more complicated decision algorithms could be implemented rather than the simple single-value threshold mentioned above. These and other options are contemplated by this description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method comprising:
   analyzing characteristics of a website to determine whether the website represents a potential source of spam content, wherein the analyzing comprises:
      computing a total number of posts associated with the website;
      calculating a publication frequency for the total number of posts in posts per minute based on a ratio of the computed total number of content items to a difference between a publication time of a newest content item in the website and a publication time of an oldest content item in the website; and
      determining whether the website in its entirety represents spam content, based on the computed total number and the calculated publication frequency, wherein the determining comprises: comparing the calculated publication frequency to a threshold frequency; and when the calculated publication frequency is greater than the threshold frequency, identifying the website in its entirety as spam content; and
   in response to the analyzing, flagging the website in its entirety as spam content.

2. The computer-implemented method of claim 1, further comprising:
   filtering the spam content from stored webcrawler data to obtain filtered webcrawler data; and
   outputting the filtered webcrawler data for presentation to a user.

3. The computer-implemented method of claim 1, wherein the determining further comprises:
   comparing the computed total number to a threshold number; and
   when the computed total number is less than the threshold number, identifying the website in its entirety as non-spam content.

4. The computer-implemented method of claim 1, wherein the threshold frequency is less than five posts per minute.

5. The computer-implemented method of claim 1, wherein the determining comprises:
   comparing the computed total number to a threshold number;
   when the computed total number is less than the threshold number, identifying the website in its entirety as non-spam content; and
   when the computed total number is greater than or equal to the threshold number:
      comparing the calculated publication frequency to the threshold frequency;
      when the calculated publication frequency is less than or equal to the threshold frequency, identifying the website in its entirety as non-spam content.

6. A computing system comprising a processor and a memory having computer-executable instructions stored thereon that, when executed by the processor, cause the computing system to:
   analyze characteristics of a website to determine whether the website represents a potential source of spam content:
      compute a total number of posts associated with the website;
      calculate a publication frequency for the total number of posts in posts per minute based on a ratio of the computed total number of content items to a difference between a publication time of a newest content item in the website and a publication time of an oldest content item in the website;
      compare the computed total number to a threshold number;
      when the computed total number is less than the threshold number, identify the website in its entirety as non-spam content; and
      when the computed total number is greater than or equal to the threshold number:
         compare the calculated publication frequency to a threshold frequency;
         when the calculated publication frequency is greater than the threshold frequency, identify the website in its entirety as spam content; and
         when the calculated publication frequency is less than or equal to the threshold frequency, identify the website in its entirety as non-spam content; and
   flag the website in its entirety as spam content.

7. A tangible and non-transitory computer readable medium having computer-executable instructions stored thereon that, when executed by a processor, perform a method comprising:
   analyzing characteristics of a website to determine whether the website represents a potential source of spam content by:
      computing a total number of posts associated with the website;
      calculating a publication frequency for the total number of posts in posts per minute based on a ratio of the computed total number of content items to a difference between a publication time of a newest content item in the website and a publication time of an oldest content item in the website; and
      determining whether the website in its entirety represents spam content, based on the computed total number of posts and the calculated publication frequency; and flagging, in response to the analyzing, the website in its entirety as spam content.

* * * * *